J. DEMETER.
SAND MOLDING MACHINE.
APPLICATION FILED JAN. 22, 1910.

960,844.

Patented June 7, 1910.
2 SHEETS—SHEET 1.

ATTEST
E. M. Fisher
J. C. Mussun

INVENTOR.
JOSEF DEMETER
By Fisher & Moser, ATTYS

J. DEMETER.
SAND MOLDING MACHINE.
APPLICATION FILED JAN. 22, 1910.

960,844.

Patented June 7, 1910.
2 SHEETS—SHEET 2.

ATTEST
E. M. Fisher
J. C. Mussun

INVENTOR
JOSEF DEMETER
BY Fisher & Mosser
ATTYS.

UNITED STATES PATENT OFFICE.

JOSEF DEMETER, OF CLEVELAND, OHIO.

SAND-MOLDING MACHINE.

960,844.     Specification of Letters Patent.     Patented June 7, 1910.

Application filed January 22, 1910. Serial No. 539,615.

*To all whom it may concern:*

Be it known that I, JOSEF DEMETER, citizen of the United States, residing at Cleveland, in the county of Cuyahoga and State of Ohio, have invented certain new and useful Improvements in Sand-Molding Machines, of which the following is a specification.

My invention relates to improvements in sand molding machines of the kind adapted for making castings, all substantially as shown and particularly pointed out in the claims.

Figure 1:
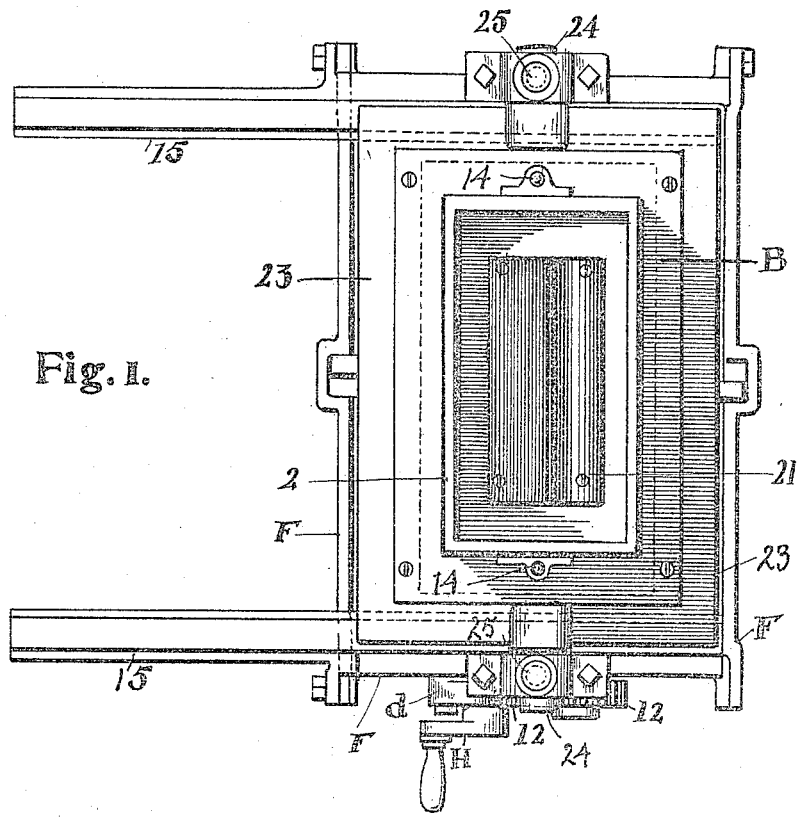
Figure 2:
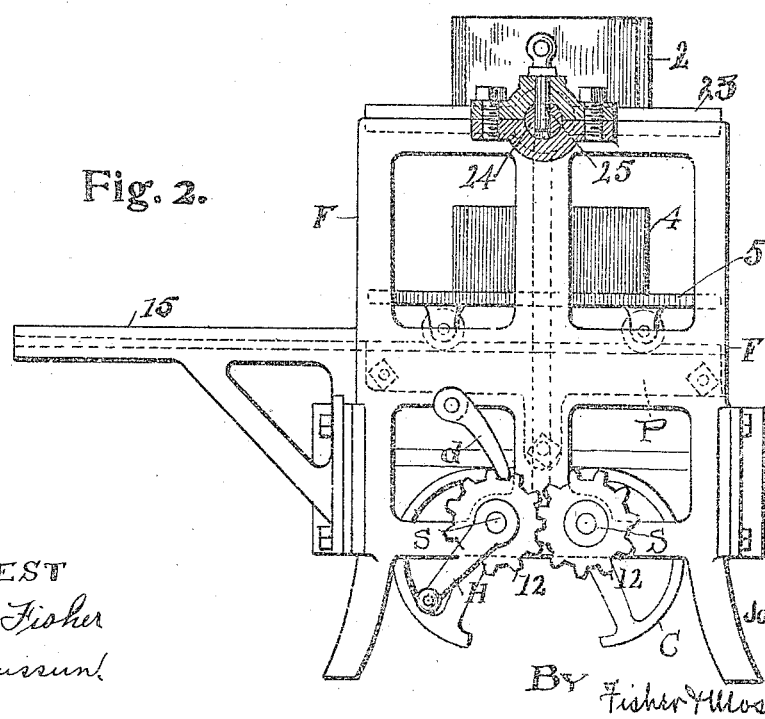
Figure 3:
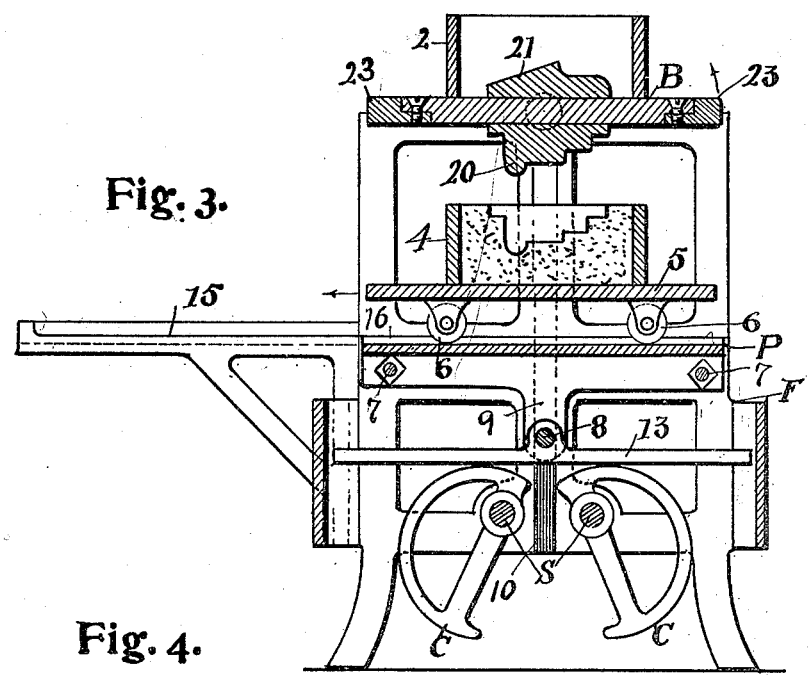
Figure 4:
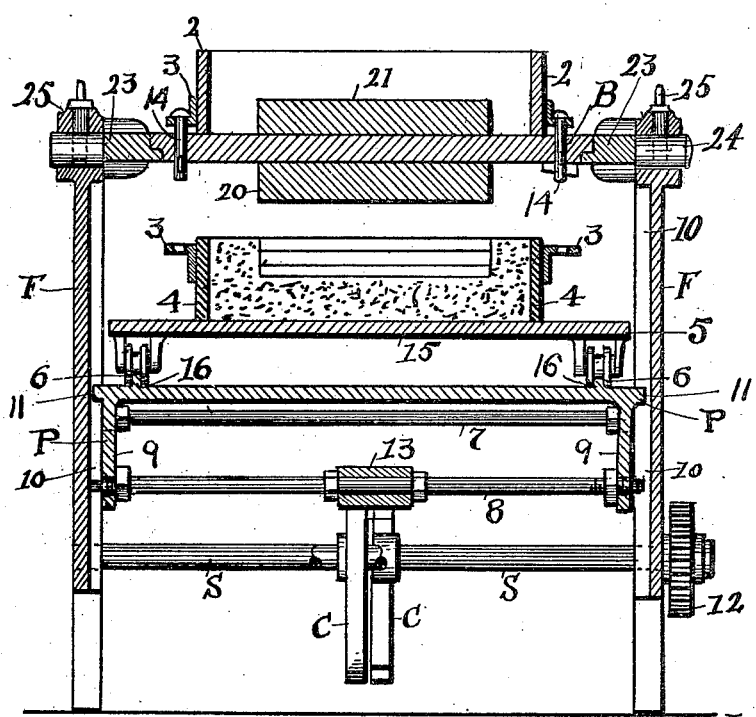

In the accompanying drawings, Figure 1 is a plan view of the machine, and Fig. 2 is an end elevation thereof. Fig. 3 is a cross section of the machine front to rear, and Fig. 4 is a central sectional elevation lengthwise thereof or at right angles to Fig. 3.

In the machine F represents the main frame as a whole and to which the other parts are brought in fixed or operating relation as will presently be seen. The mold box as a whole or in its entirety comprises the pattern plate B and the cope and the drag 2 and 4 respectively adapted to be detachably and separately mounted on said plate.

P represents a platform vertically movable or movable up and down in guideways 10 in main frame F, and 5 is a carriage provided with wheels 6 adapted to run on tracks on said platform, all as hereinafter more fully described. The said platform comprises a bottom frame of its own provided with depending portions 9 which are connected by tie rods 7 front and rear and a tie rod 8 in the lower ends of said depending side portions 9 and having its ends extending into the guide channels or grooves 10 in the main frame to help steady and guide the platform therein. The said platform also has lugs 11 at its ends running in said channels 10 and thus the said platform P is held in horizontal position and in traveling relation within frame F to raise and lower the carriage 5 and the inverted flask member thereon as the operations of the machine may require and as hereinafter fully described. This vertical operation or movement is effected by means of a set or pair conjointly operated rotatable cams C which are mounted on parallel shafts S, having equal intermeshing gears or pinions 12 and jointly operated by a hand crank H or other hand or power means as may be preferred. A pawl or dog *d* engages and holds said pinions in any adjusted position. By the foregoing construction and arrangement of parts the said cams C are caused to rotate in opposite directions, and are so disposed beneath platform P as to engage the tilting lift bar 13 on opposite sides of its pivot simultaneously and equally and thus raise said platform or lower the same as may be desired at the time. The said bar 13 is pivotally mounted at its middle upon the said tie and guide rod 8 centrally beneath the platform on its hangers 9, and said cams are arranged to bear upon said bar at opposite sides of its pivot and apart therefrom relatively as seen in Fig. 3 so as to equalize the lift and give a sustained movement up and down to said platform according as crank H is turned one way or the other. This vertical movement of the platform has to do directly with receiving both parts of the flask sucessively, in this instance, or instead of using say two machines for the two parts separately.

Obviously, the lift of the platform is intended to provide for the reception and discharge of the mold member, 2 or 4, as it is reversed from plate B and delivered to carriage 5 on said platform and the first position is at such elevation that after the said mold or flask member is inverted on plate B the carriage 5 will move up into receiving position and upon releasing the said member by withdrawing the bolts 14 the said member will not only rest upon the carriage 5 but is then lowered to be run out upon the laterally extending brackets or arms 15 and which have tracks coincident with the tracks 16 on platform P.

The patterns 20 and 21 for the cope and the drag respectively are removably affixed to plate B so as to be exchanged by others, and said board is removably set within a border frame 23 having trunnions 24 mounted in suitable bearings in the main frame. Normally the said parts are in the fixed horizontal position seen in Figs. 2 and 3, the trunnions 24 being transversely bored to receive locking pins 25 through the said bearing in the main frame. When the plate B and its frame 23 are to be rotated or inverted said pins are withdrawn but otherwise are in engaging position, Fig. 2. These pins alone serve to hold said frame and plate firmly in place. Then as the said parts are released and turned over to deliver the mold member, 2 or 4, upon carriage 5, and said carriage is raised for this purpose through the action of cams C and platform P, the cotter or steady pins 14 are removed and said mold member is delivered free upon the carriage and can be lowered to be run aside on the arms 15 and taken away.

By the use of a mold plate B as a separate part removably fixed in the border frame 23 I obtain the important advantage of having said border frame as a permanent member of the machine in which I can exchange or interchange various patterns by merely inserting one or another plate having the patterns fixed on opposite sides thereof. For example, if I desire to use other patterns than those shown I simply remove plate B with the patterns thereon and insert another plate with patterns fixed thereon, so that the plates with their patterns are removed and replaced together while frame 23 remains a fixed part of the machine and in relation and operation is practically a part with plate B. That is, said frame and plate are on the same plane and for all operating purposes are unitary but still they are separable for the purposes above set forth.

The cotter pins 14 are shown as engaged through right angled brackets 3 on the flask members 2 and 4.

What I claim is:

1. A sand molding machine having a main frame, a platform adapted to be moved up and down in said frame and guided thereby, said platform provided with a pivoted lift bar centrally at its bottom, in combination with a pair of oppositely rotatable cams engaging said lift bar on opposite sides of its pivot and separate shafts therefor, and gears operatively connecting said shafts.

2. A sand molding machine having a main frame with vertical guideways in its sides, in combination with a platform having extensions slidable in said channels and a lift bar pivoted at its middle on the middle and bottom of said platform, a pair of cams rotatably mounted beneath said bar on opposite sides of its pivot, separate shafts carrying said cams and gears of the same size mounted on said head and meshing with each other and adapted to operate said cams.

3. In molding machines, a main frame having vertical guideways within its ends and bearings at its top and provided with track extensions at its front, in combination with an invertible open border-frame having trunnions rotatably mounted in said bearings, means to lock said trunnions against rotation, a pattern plate removably seated within said border frame and of the same thickness to provide flush surfaces on opposite sides thereof and having openings through said plate in line with the axis of said trunnions, a vertically movable platform having projecting parts slidably confined within said guideways and provided with tracks adapted to aline with said frame track extensions, and means to raise said platform comprising a lift bar centrally at its bottom, cams rotatably mounted within said main frame to engage said lift bars, means to rotate said cams to different set positions.

In testimony whereof I affix my signature in presence of two witnesses.

JOSEF DEMETER.

Witnesses:
F. C. MUSSUN,
H. T. FISHER.